United States Patent [19]

Morton

[11] Patent Number: 5,752,111
[45] Date of Patent: May 12, 1998

[54] MULTI-LENS CAMERA WHICH RECORDS STATUS ON FILM

[75] Inventor: Roger Roy A. Morton, Penfield, N.Y.

[73] Assignee: Eastman Kodak Company, Rochester, N.Y.

[21] Appl. No.: 600,713

[22] Filed: Feb. 13, 1996

[51] Int. Cl.$^6$ .............................. G03B 35/00; G03B 35/08
[52] U.S. Cl. .......................... 396/324; 396/326; 396/333
[58] Field of Search ..................................... 396/322, 324, 396/326, 332, 333

[56] References Cited

U.S. PATENT DOCUMENTS

| | | | |
|---|---|---|---|
| 3,895,867 | 7/1975 | Lo et al. | 355/77 |
| 3,960,563 | 6/1976 | Lo et al. | 96/40 |
| 4,040,071 | 8/1977 | Shane | 354/113 |
| 4,063,265 | 12/1977 | Lo et al. | |
| 4,475,798 | 10/1984 | Smith et al. | 354/114 |
| 4,965,626 | 10/1990 | Robison et al. | 355/40 |
| 5,063,441 | 11/1991 | Lipton et al. | |
| 5,142,357 | 8/1992 | Lipton et al. | |
| 5,196,859 | 3/1993 | Tomiyama | 346/74.5 |
| 5,278,608 | 1/1994 | Taylor et al. | 355/22 |
| 5,294,951 | 3/1994 | Lo | 354/111 |
| 5,313,239 | 5/1994 | Mizukawa | 354/250 |
| 5,424,792 | 6/1995 | Mikami | 354/120 |

FOREIGN PATENT DOCUMENTS

| | | |
|---|---|---|
| 294360 | 1/1954 | Germany. |
| 5-297484 | 11/1993 | Japan. |
| 7-239498 | 9/1995 | Japan. |

*Primary Examiner*—Michael L. Gellner
*Assistant Examiner*—Daniel Chapik
*Attorney, Agent, or Firm*—Gordon M. Stewart

[57] ABSTRACT

A multi-lens camera, comprising:
  a housing;
  at least two lenses spaced apart on the housing to obtain different views of a single scene for capturing as a set of simultaneously captured separate frames;
  a status indicator which provides an indication of at least one condition under which the simultaneously captured frames were captured; and
  a recorder which can record the indication in association with the set.

A method of processing a film exposed by the camera, and an apparatus for performing the method, are also provided.

8 Claims, 2 Drawing Sheets

MULTI-LENS CAMERA WHICH RECORDS STATUS ON FILM

FIELD OF THE INVENTION

The invention relates generally to the field of integral image elements which may display depth, motion or other images, and apparatus and methods for making such elements.

BACKGROUND OF THE INVENTION

One application of multi-lens capture is the creation of integral image elements which use a lenticular lens sheet or a fly's eye lens sheet, and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others; as well as allowed U.S. patent application Ser. No. 07/931,744. Three-dimensional integral image elements with lenticular lens sheets, use interlaced vertical image slices from captured views of a scene taken at positions which are laterally shifted with respect to one another. These interlaced slices are aligned with the lenticules so that a three-dimensional image is viewable when the lenticules are vertically oriented with respect to a viewer's eyes.

The final integral image may either be viewed by light transmitted through it, or may be coated with a reflective layer behind the image such as described in U.S. Pat. No. 3,751,258, U.S. Pat. No. 2,500,511, U.S. Pat. No. 2,039,648, U.S. Pat. No. 1,918,705 and GB 492,186.

One method of capturing the laterally shifted views of a scene, is to use conventional photographic film in a camera having two or more lenses laterally spaced apart. When a scene is to be captured, the respective shutters for the lenses are opened simultaneously so as to expose different frames of the film to the respective views seen by the two or more lenses. When a scene is captured by such a camera then, it will be captured as a set of frames which record respective different views of the single scene. Different scenes can be captured on the same film so that an exposed film may contain one or more sets of frames for the one or more scenes captured. Such a camera is disclosed, for example, in U.S. Pat. No. 3,960,563 and U.S. Pat. No. 4,475,798.

The importance of the values of various quantities in obtaining integral images of good quality was appreciated in U.S. Pat. No. 3,960,563. However, these quantities were to be pre-calculated and set before a given scene was captured. Such a technique is highly impractical where a user desires to spontaneously capture a scene. U.S. Pat. No. 4,965,626 describes recording on a film in a conventional single lens camera, specified picture taking conditions such as camera orientation, date of exposure, and time of exposure and the like. However, no guidance on improving the realism of a lenticular image is provided, nor is there any guidance on how automatic interlacing of frames from a single set in a film containing multiple sets, might be accomplished.

Exposed and processed film from a multi-lens camera of the above type can be automatically scanned in a known manner to generate signal files (typically digital image files) representing images on the film. The scanned images can then be interlaced in a known manner, such as by a suitably programmed digital computer, to form an integral image.

However, in the foregoing process, no information is available to the computer which enables an accurate reproduction of the original scene. For example, in order to obtain a realistic reproduction of the scene when the integral image is viewed, the distance by which the multiple lenses of the camera were spaced apart during film exposure, will affect the positioning of the interlaced lines beneath lenticules of a lenticular sheet. Yet neither this information nor any other information is available to the computer which will allow it to automatically generate an integral image which will realistically reproduce the original scene.

It would be desirable then to provide a camera which can simultaneously capture a set of frames recording respective different views of a single scene, and which camera will provide a means by which the resulting exposed film can be automatically handled to produce a realistic integral image product. It would also be desirable to provide a process for automatically forming an integral image from such a film and an apparatus for performing such a method.

SUMMARY OF THE INVENTION

The present invention realizes that to aid in automatically forming an integral image from a film from a multi-lens camera, indications of the conditions under which each set of was captured can be recorded in association with each set. For a camera using conventional film, this means recording indications such as the relative positions of the different views seen by the lenses, directly on the film.

The present invention further realizes that in forming an integral image from a film from a multi-lens camera, it is necessary to know which frames belong to which set. In an automated apparatus for forming an integral image, which may use a computer to interlace scanned images, there is no way for the computer to know how many frames belong to a given set. That is, the computer cannot distinguish scanned frames of one set from those of a different set, and thus does not know how many (and hence, which ones) of the frames should be selected for interlacing.

The present invention provides, in one aspect, a multi-lens camera for simultaneously capturing at least one set of separate frames recording respective different views of a single scene. The camera comprises:

a housing;

at least two lenses spaced apart on the housing to obtain different views of a single scene for capturing as a set of simultaneously captured separate frames;

a status indicator which provides an indication of one or more conditions under which the views of the set were captured; and a recorder which can record the indication (typically, but not necessarily, in association with the set).

The one or more conditions provided by the status indicator can include any indication of conditions under which the set was captured. These include distance between the lenses (lens spacing), distance to an object in the scene, or even the number of views (and hence the number of frames) which are part of the same set of frames.

In a second aspect of the present invention, the multi-lens camera is particularly adapted for using a photographic film. In this aspect, the camera additionally has a film holder which can hold a photographic film so that respective portions can be simultaneously exposed to the different views and captured thereon as a set of simultaneously captured frames. A shutter assembly is also provided to perform the simultaneous exposure. The recorder records the indication on the film in association with the set of simultaneously captured frames.

Further aspects of the present invention include a method of processing a film exposed in a camera of the foregoing type to form an image, such as an integral image, and an apparatus for performing the method.

Other applications of the camera and method of the present invention, include forming images for subsequent interpolation (such as described in U.S. Pat. No. 5,455,689 and U.S. patent application Ser. No. 08/141,157 by Fogel filed Oct. 21, 1993) to generate further images corresponding to viewing positions on a line which passes through the lenses or from a position which is within an area related to the positions of the viewing lenses.

A camera of the present invention can simultaneously capture a set of frames recording respective different views of a single scene. The camera, in its recording function, also provides a means by which the realism of an integral image element made from the frames, can be enhanced. In particular, conditions such as camera lens spacing at the time the views were simultaneously captured, can be accounted for in constructing the integral image. The recording of such information in association with the set of simultaneously exposed frames, allows the formation of an integral image from them to be partially or completely automated. Further, an identification of the frames which are members of a single set can be recorded on the film and automatically read from an exposed film, so that all frames of a single set can then be automatically selected to form the integral image.

BRIEF DESCRIPTION OF THE DRAWINGS

Embodiments of the invention will now be described, in which.

To facilitate understanding, identical reference numerals have been used, where possible, to designate identical elements that are common to the figures.

EMBODIMENTS OF THE INVENTION

Figure 1:
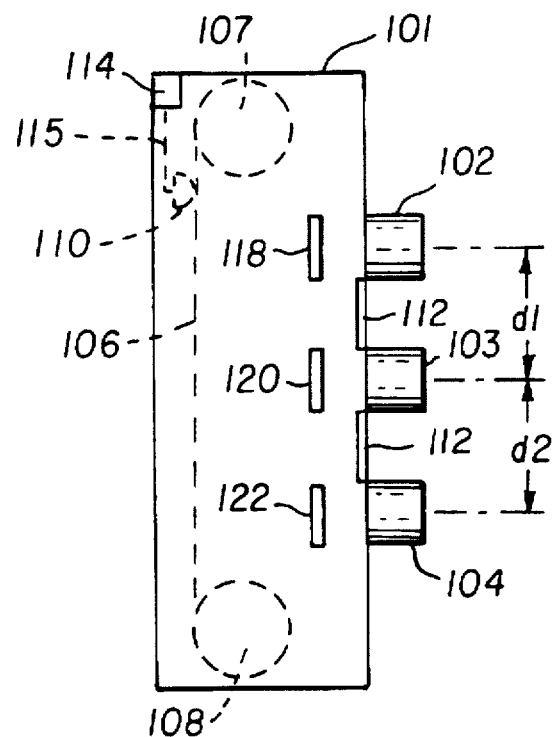
FIG. 1 is top view of a multi-lens camera of the present invention, showing a film positioned inside it as well as some of the internal components.

For the purposes of the present invention, by an "integral" image it will be understood is referenced an image composed of linear segments (sometimes referenced simply as "lines") from a number of separate images. Such an integral image can be aligned with a lenticular lens sheet so that each of the images is viewable when a user's eyes are at the correct angle relative to the lens sheet. An integral image of the present invention will contain one or more three-dimensional images. By a "three-dimensional image", is meant an integral image which, when viewed through the front side of the lens sheet (that is viewed through the lens elements), has a visible depth element as a result of the various views being relationally configured to appear as the views that would be seen from different positions when actually viewing a three-dimensional object. A depth element means the ability to at least partially look around an object in the scene. This can be obtained by interlacing lines from different perspective views of the same scene, in a known manner. Thus, a three-dimensional image necessarily includes at least two views of a scene. These views are typically arranged to be viewable when the lenticules of the element are positioned vertically with respect to a plane of sight of a user's eyes.

In the present invention the status indicator may be associated with a fixed or variable quantity. For example, in a multi-lens camera in which the lens spacing is fixed, the status indicator may just contain data on the fixed distance. An indication of the lens spacing can then be recorded in association with the set of simultaneously exposed frames, which indication will be useful in forming an integral image to realistically reproduce the original scene. By an "indication" is referenced the fact that the lens spacing need not be recorded directly as such, but could be recorded as an indirectly generated quantity. For example, data on distance to an object in a scene could be combined with the lens spacing data, and the indication of the relative positions of the different views recorded based on the angle of the views to the object. In this latter situation, the lens spacing data is recorded in an indirect manner as a derived quantity.

In the preferred embodiment of the multi-lens camera though, the lenses are movable with respect to one another so that the lens spacing is adjustable. This allows better capturing of a scene and hence a better integral image. In this embodiment, a lens spacing detector measures the distance between the lenses. The status indicator then obtains this quantity from the lens spacing detector when the set of frames is captured.

While various means of recording the indication on the film are possible, the preferred means is in the form of magnetic data. In this case, the recorder comprises a magnetic recording heat positioned to record the indication on a magnetic layer on the film or a layer of magnetic tape which lays on or is attached to the photographic film. Alternatively, a separate digital recording media (such as a diskette) or communication may be used.

The method of the present invention can be used to form an integral image from any film carrying a set of separate frames recording simultaneous different views of a single scene, and which film carries an indication of one or more conditions under which the views were simultaneously recorded. The one or more conditions may, for example, be selected from the following: an indication of the relative positions of the different views; the distance to an object in the scene; an identification of which frames belong to a single set containing views of the same single scene. In the method the film, if not carrying images in a machine detectable form (such as in the case of an exposed and unprocessed photographic film), is first processed to make the images detectable. The frames are then scanned to obtain respective signal representations of the images on them. The indication of the one or more conditions is read from the film. Vertical lines from the scanned images are then interlaced from the scanned images of the set, to form the integral image, with at least one feature of the lines being determined at least in part by the read indication. For example, if the indication provides an identification of those frames which are members of a single set, then this indication will determine which scanned images are used for the interlacing. If the indication provides other information, such as lens spacing, it will be used in part to determine the positioning, number and/or width of the lines. The interlacing can, if desired, be done automatically using this indication plus any other conditions (such as lenticule width, expected viewing distance of the final integral image element) previously input into a processing apparatus.

An apparatus for performing the foregoing method of the present invention, will include a scanner which can generate respective signal representations of images of the set from a film. A reader (such as a reading head for reading indications recorded on a magnetic layer of the film) is provided which can read the indication. An image integrator interlaces vertical lines from the scanned images of the set to form an integral image based on one or more conditions provided by the indications recorded on the film. Again, the apparatus can be constructed to carry out the method automatically, as discussed above.

Referring now to FIG. 1, there is shown a multi-lens camera 101 of the present invention, which is used to capture a specific scene. Three lenses 102, 103 and 104 are used to obtain three different views of the scene to be captured. Camera 101 is designed for use with a photographic film 106 carrying well known light sensitive silver halide emulsion layers. Film 106 is additionally provided with a magnetic layer. Film 106 may be a typical consumer type film (such as 35 mm or the newer Advanced Photo System standard) contained as a roll wound within a canister. Any suitable arrangement can be provided to act as a film holder which positions respective portions of film 106 behind lenses 102, 103, and 104 for simultaneous exposure to the different views obtained by lenses 102, 103, and 104. During such simultaneous exposure, the different views obtained by lenses 102, 103 and 104 will be captured on film 106 as a set of simultaneously captured frames.

In one configuration, film 106 leaves a supply roll 107 removable held internally within camera 101. The film then passes to a take up roll 108. Film 106 can be advanced to take up roll 108 and rewound on supply roll 107, by well known film advance and rewind mechanisms. A shutter assembly includes individual shutters 118, 120 and 122 mounted behind each lens. These shutters are interconnected so that their opening and closing is simultaneous when, for example, a shutter opening button (not shown) is depressed by a user. Such interconnected multiple shutters forming a single shutter assembly are disclosed, for example, in U.S. Pat. No. 3,960,563 and U.S. Pat. No. 4,475,798.

Figure 2:
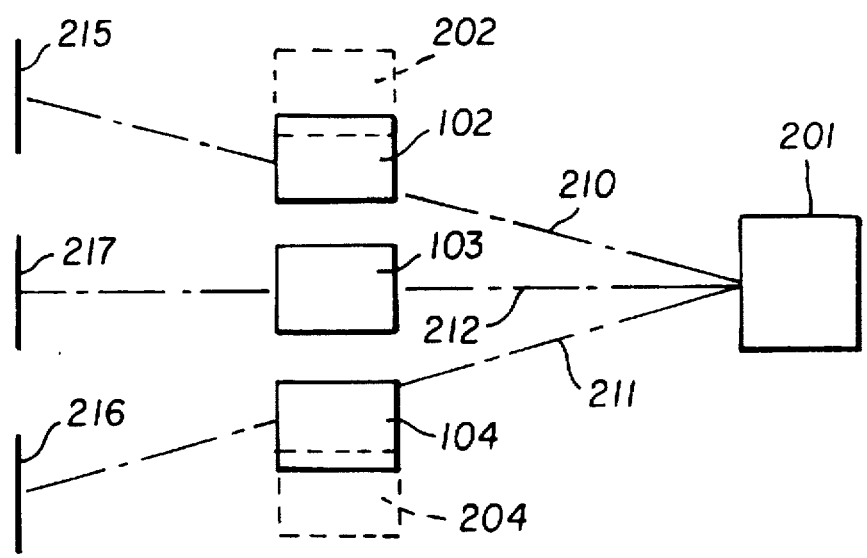
FIG. 2 is a top view illustrating the movement of the lenses of the camera of FIG. 1.

When focusing on a close object, it may be desirable to make small adjustment in lens spacing to obtain the best three-dimensional representation of an object such as a box 201 shown in FIG. 2. For this purpose, the distance between lenses 102, 103 and 104 (that is, the lens spacing) may be adjustable. Such distances are represented by d1 and d2 shown in FIG. 1, and are typically measured between the optical axis of adjacent lenses. In such case, camera 101 can be provided with a lens spacing detector 112 for measuring the lens spacing. Detector 112 may be in the form of sliding potentiometers or other suitable measuring devices.

Referring to FIG. 2, the ability of the lens spacing to be varied is shown more clearly. In particular, lens 102 is able to move from a first position in solid lines to a second position 202 shown in dashed lines. Similarly lens 104 is able to move from the position shown in solid lines to position 204 shown in dashed lines. The position of lens 206 in this arrangement is fixed, the movement of lenses 102 and 104 accomplishing the variation in lens spacing. As a consequence the principal axes 210 of lens 102 is able to be brought onto the center of an object 201. Similarly the principal axes of axes 211 of lens 104 is also brought into the center of object 201 so that the principle axes 210, 211 and 212 all converge on the close in object 201 while remaining centered on the respective portions of the film exposed to the different views, namely portions 215, 216 and 217 respectively. Portions 215, 216 and 217, following exposure, represent a set of simultaneously captured frames.

The information about the movement of the lenses to accommodate the best view of an object, is transferred from lens spacing detector 112 to a status indicator 114. Status indicator 114 converts this information to a suitable indication which is fed through connection 115 to magnetic recording head for recording on the magnetic layer on the film in association with the set of simultaneously captured frames. By "in association with" in this context, is meant that there is some way provided which will allow the recorded information when later read, to be matched with the set of frames corresponding to it. One simple way is to have write head 110 record this information at the same location relative to the three frames forming each set (for example, immediately following the frame captured from lens 102.

Instead of, or in addition to, recording an indication of the lens spacing, other indications which can be recorded in association with any given set of frames includes: range finder distance to the scene, orientation of the camera (whether vertical or horizontal), when multiple zoom lenses are used the zoom settings of each lens, the focusing distance of each lens, and an identification of those frames which are members of each single set (that is, which are different views of the same scene). For recording such other indications, one or more additional detectors (not shown) for measuring the corresponding condition can be provided on camera 101. Preferably, the indications are recorded on the magnetic layer of film 106 as digital data.

Figure 3:
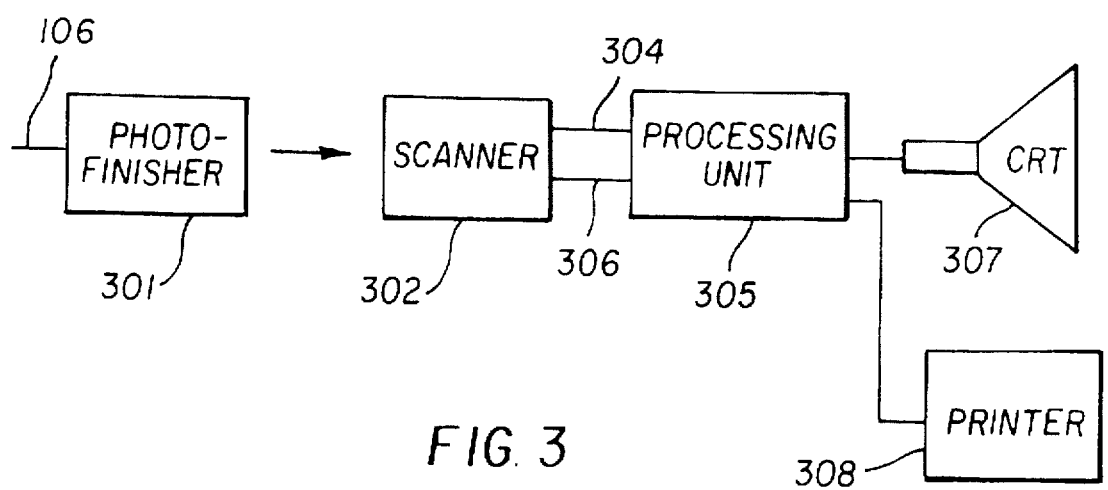
FIG. 3 a block diagram of an apparatus of the present invention which can automatically process an exposed film from a camera of FIG. 1.
Figure 4:
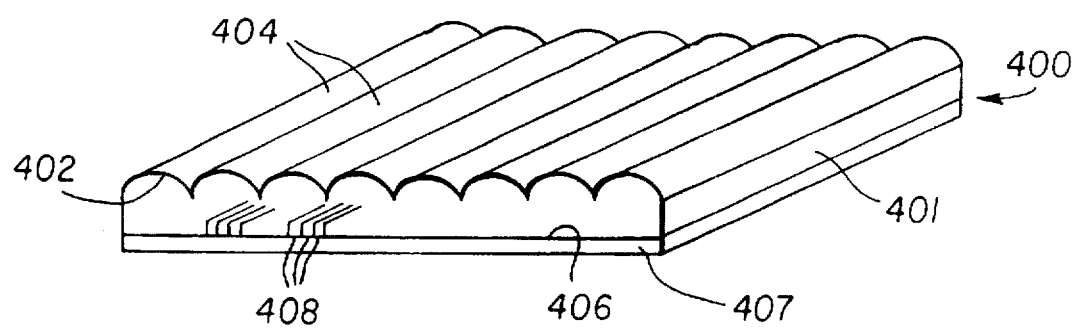
FIG. 4 is an end view of an integral image element formed of an integral image produced by the apparatus of FIG. 3, positioned in alignment with a lenticular lens sheet to form an integral image element.

FIG. 3 shows one means for processing film 106 to form a final integral image. The film 106 is developed by a photofinisher 301 to render the image detectable by a scanner (normally this means the image will be fixed in an unalterable form). Photofinisher 301 can be an automatic type processor such as a mini-lab, although it need not be. Developed film 106 is then passed to a scanner 302 which obtains respective digital image signal representations of the images on the frames. Scanner 302 passes the digital image data on line 304 to an image processing unit 305 which processes the images to form an integral image. Processing unit 305 can, for example, be a suitably programmed digital computer.

In addition a magnetic read head within scanner 302 reads the indications (which are preferably in the form of digital data) concerning the film capture conditions and passes this data on line 306 to processing unit 305. Processing unit 305 interlaces vertical lines from the images of a set to form an integral image. The formation of suitable integral images by interlacing lines from different scenes, and their exposing or writing to the back side of integral imaging elements, is described for example, in U.S. Pat. No. 5,278,608, U.S. Pat. No. 5,276,478 and U.S. Pat. No. 5,455,689. Since the integral image formed consists of one or more different views of the same scene, it will be a three-dimensional integral image.

The data on line 306 representing conditions under which a given set of frames was exposed, is used to optimize the processing operation performed in processing unit 305. This aids in obtaining an integral image which, when viewed under the anticipated viewing conditions, will provide a fairly realistic reproduction of the original scene. Such data can be used, at least in part along with any other operator input conditions (e.g. lenticule width of a lenticular lens sheet and anticipated viewing distance), to determine the positioning, number and/or width of the interlaced lines. For example, if the data states that the next three frames are part of a single simultaneously exposed set, processing unit 305 can automatically choose only those three frames for interlacing (otherwise, without operator input or complex image analysis, processing unit 305 has no way of knowing which frames are members of a single set). If the data relates to lens spacing or distance to an object in a scene, this data can automatically be used along with any other user input conditions (e.g. width of lenticules, intended viewing distance of integral image element) to aid in providing a more realistic looking reproduction of the original scene. U.S. Pat. No. 3,960,563, for example, discusses the inter-relationship between several such conditions.

The integral image produced by the foregoing operation can then be printed by a printer 308 onto a suitable substrate 407 (such as a photosensitive paper) and laminated to a flat back surface 406 of a lenticular lens sheet 401. Lenticular lens sheet 401 also has a front surface 402 with identical, parallel semi-cylindrical lenticules 404. Alternatively, the integral image could be printed directly onto the back surface 406. When printed and aligned with lenticular lens sheet 401, at least one set of three lines 408 (one from each view captured by camera 101 during exposure of a set of frames) is aligned for viewing through a corresponding lenticule in a known manner. The resulting product is an integral image element 400.

Rather than being used to form an integral image, the resulting digital image data obtained from scanner 302 (representing the recorded indication) can be used by processing unit 305 to form some other desired viewable image. For example, where the set has two images only, each could be printed separately but on a single sheet for later lamination to differently polarized filters. The resulting assembly could be viewed through suitably polarized filters so that a three-dimensional view is provided, in a known manner. Alternatively, the resulting digital image data may be processed in processing unit 305 to form a digital image corresponding to a view not actually observed by camera 101 (that is, at a position other than from the position of any one of the lenses 102, 103 or 104). This can be accomplished using known interpolation and/or extrapolation algorithms in a known manner. The resulting view can then be printed by printer 308, displayed on CRT display 307 or used in conjunction with the image from other actual views or the image from other calculated views, to form an integral image for printing and display behind a lenticular lens sheet, as described above.

It will be appreciated that even when processing unit 305 is not forming an integral image, the data on line 306 representing conditions under which a given set of frames was exposed is still useful in aiding automatic processing by unit 305. For example, if a view of the scene not actually obtained by any of the lenses is to be generated by extrapolation or interpolation, it will be useful to know the lens spacing, focal length, and the distance from the lens to the object of interest in the scene. Indications of such conditions automatically read from the film 106 by the read head in scanner 302 can be used, along with any other conditions input by a user, to automatically form the desired image.

The invention has been described with reference to a preferred embodiment. However, it will be appreciated that variations and modifications can be effected by a person of ordinary skill in the art without departing from the scope of the invention.

| PARTS LIST | |
|---|---|
| 101 | Camera |
| 102, 103 & 104 | Lenses |
| 106 | Film |
| 107 | Supply Roll |
| 108 | Take Up Roll |
| 110 | Write Head |
| 112 | Detector |
| 114 | Status Indicator |
| 115 | Connection |
| 118, 120 & 122 | Shutters |
| 201 | Box |
| 202 | Second Position |
| 204 | Position |
| 206 | Lens |
| 210, 211 & 212 | Axes |
| 215, 216 & 217 | Portions |
| 301 | Photofinisher |
| 302 | Scanner |
| 304 | Data On Line |
| 305 | Processing Unit |
| 306 | Data On Line |
| 307 | CRT Display |
| 308 | Printer |
| 400 | Element |
| 401 | Lenticular Lens Sheet |
| 402 | Front Surface |
| 404 | Semi-Cylindrical Lenticules |
| 406 | Back Surface |
| 407 | Substrate |
| 408 | Three Lines |

I claim:
1. A multi-lens camera, comprising:
a housing;
at least two lenses spaced apart on the housing to obtain different views of a single scene for capturing as a set of simultaneously captured separate frames;
a status indicator which provides an indication of the relative positions of the different views based on the distance between the lenses when the set is captured; and
a recorder which can record the indication in association with the set.
2. A multi-lens camera comprising:
a housing;
at least two lenses spaced apart on the housing to obtain different views of a scene;
a film holder to hold a photographic film so that respective portions can be simultaneously exposed to the different views which are captured thereon as a set of simultaneously captured frames;
a shutter assembly to perform the simultaneous exposure;
a status indicator which provides an indication of the relative positions of the different views based on the distance between the lenses when the set is recorded; and
a recorder which can record the indication on the film in association with the set.
3. A multi-lens camera according to claim 2 wherein the distance between the lenses is adjustable, the camera additionally comprising a lens spacing detector which measures the distance between the lenses.
4. A multi-lens camera according to claim 2 wherein the camera additionally comprises an object distance detector which measures the distance to at least one object in the scene, and wherein the recorder additionally records on the film in association with the set of simultaneously recorded frames, an indication of the object distance.

5. A multi-lens camera according to claim 4 wherein the camera additionally comprises one or more additional detectors for measuring other conditions under which the views were captured, and wherein the recorder additionally records on the film an indication of such other conditions in association with the set of simultaneously recorded frames, wherein the additional detectors measure other conditions selected from a distance to the scene, an orientation of the camera, a zoom lens setting, a focusing distance of each lens, and an identification of those frames which are members of a single set.

6. A multi-lens camera according to claim 2 wherein the recorder comprises a magnetic recording head positioned to record the indication on a magnetic layer on the film.

7. A multi-lens camera comprising:

a housing;

at least two lenses spaced apart on the housing to obtain different views of a scene;

a film holder to hold a photographic film so that respective portions can be simultaneously exposed to the different views which are captured thereon as a set of simultaneously captured frames;

a shutter assembly to perform the simultaneous exposure;

a status indicator which provides an identification of the captured frames which are members of the same set; and a recorder which can record the identification on the film in association with the set.

8. A multi-lens camera according to claim 7 wherein the recorder comprises a magnetic recording head positioned to record the indication on a magnetic layer on the film.

* * * * *